(12) United States Patent
Matas

(10) Patent No.: US 8,521,944 B2
(45) Date of Patent: Aug. 27, 2013

(54) PERFORMING MEMORY ACCESSES USING MEMORY CONTEXT INFORMATION

(75) Inventor: Ramon Matas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 12/872,889

(22) Filed: Aug. 31, 2010

(65) Prior Publication Data

US 2012/0054425 A1  Mar. 1, 2012

(51) Int. Cl.
*G06F 12/00* (2006.01)

(52) U.S. Cl.
USPC .............................................. 711/3; 711/170

(58) Field of Classification Search
USPC ............................................................ 711/3
See application file for complete search history.

(56) References Cited

U.S. PATENT DOCUMENTS

| | | | |
|---|---|---|---|
| 5,584,017 A * | 12/1996 | Pierce et al. | 711/146 |
| 7,627,735 B2 | 12/2009 | Espasa et al. | |
| 2002/0144079 A1 * | 10/2002 | Willis et al. | 711/205 |
| 2004/0019891 A1 * | 1/2004 | Koenen | 718/102 |
| 2009/0019232 A1 * | 1/2009 | Deshpande et al. | 711/141 |
| 2010/0235598 A1 * | 9/2010 | Bouvier | 711/163 |
| 2011/0055487 A1 * | 3/2011 | Sapronov et al. | 711/130 |
| 2011/0055515 A1 * | 3/2011 | Khubaib et al. | 711/207 |
| 2011/0055838 A1 * | 3/2011 | Moyes | 718/102 |

OTHER PUBLICATIONS

Intel, Intel® 64 and IA-32 Architectures Software Developer's Manual vol. 3A: System Programming Guide, Part 1, Section 8.2, 64 pages, Jun. 2010.
Intel, Intel® RAID Controller SRCS16, Performance—Tuning White Paper, Revision 1.0, Mar. 18, 2005, Enterprise Platforms and Services Division—Marketing, 11 pages.

* cited by examiner

*Primary Examiner* — Kaushikkumar Patel
(74) *Attorney, Agent, or Firm* — Trop, Pruner & Hu, P.C.

(57) ABSTRACT

In one embodiment, a processor includes an address generation unit having a memory context logic to determine whether a memory context identifier associated with an address of a memory access request corresponds to an agent memory context identifier for the processor, and to handle the memory address request based on the determination.

16 Claims, 8 Drawing Sheets

PERFORMING MEMORY ACCESSES USING MEMORY CONTEXT INFORMATION

BACKGROUND

Modern processors are incorporating ever greater amounts of circuitry within a single processor. For example, multi-core and many-core processors are being introduced that include a number of different processing cores or engines, in addition to other logic, internal memory such as one or more levels of cache memory storage, and so forth. In addition, such processors are often programmed to perform multiple threads of execution concurrently. Also, individual processors can be connected together in multichip clusters.

As a result, maintaining full compliance with memory ordering rules of an instruction set architecture (ISA) while still providing efficiency in memory accesses is becoming very difficult. The term "memory ordering" refers to the order in which a processor issues reads (loads) and writes (stores) to system memory. Different processor architectures support different memory-ordering models depending on the architecture. In so-called program or strong ordering, reads and writes are issued in program order. To allow performance optimization of instruction execution, some architectures provide for a memory-ordering model that allows for performance enhancements such as allowing reads to proceed ahead of buffered writes.

Since data may be used by different agents in the same or different processors, copies of data can be stored in various locations of a system, e.g., one or more cache memories associated with different processors. However, a coherent view of the data is to be maintained. While efficient cache line sharing between all agents in a system is a design goal, some of the data may only be used locally or shared only by a few threads. Some regions of memory can be defined as cacheable, meaning that when a processor seeks to write data to a memory, the data can initially be stored in a cache memory associated with the processor, without immediately writing the data to the system memory. Thus, data can be stored in a cache and also a store can occur to such a cache. In contrast, an uncacheable memory region immediately causes the requested write operation to be written to the memory, and data of an uncacheable request is not stored in a cache. In current systems, any memory access to cacheable memory may have to look up a given memory location in all caches in the system, which increases latency and traffic. To reduce this overhead, mechanisms such as snoop filters are implemented in hardware, but these resources can consume a large chip area, particularly as the number of collaborative agents increase.

DETAILED DESCRIPTION

In various embodiments, information regarding a potential data location of data stored in a memory system can be leveraged to provide for optimized memory flows and reduced data structures, as well as to reduce the amount of communication within a system to obtain access to such data. While the scope of the present invention is not limited in this regard, both operating system and application software may take advantage of this information in allocating memory to a given thread, and in handling access requests within the thread. In this way, memory ordering rules of an instruction set architecture (ISA) can be met with reduced overhead, both as to communications and to physical structures such as snoop filters, directories, and so forth. That is, information regarding potential data location can be used by hardware to optimize memory flows and reduce the need for dedicated physical structures, and as a result reduce the memory ordering rules overhead.

To this end, embodiments may provide for memory context information. As used herein, a "memory context" is an identifier or other information associated with one or more components of a system that can be used to identify a potential data location for data of a given application, thread, or other user-level context in which data can be stored and modified. To maintain such memory contexts, various components of a system may include hardware to maintain and store a memory context associated with the component. For example, various structures such as processors, caches, memory, bus agents such as peripheral devices and so forth, each may include a storage such as a register to provide for storage of this context information.

While these memory contexts can be set in different manners in various embodiments, in one particular embodiment such memory contexts may be set by an operating system at system startup. For example, in a given implementation a processor identification instruction (e.g., a so-called CPUID instruction of an instruction set architecture (ISA)) may cause firmware and/or an operating system (OS) to obtain information regarding available system agents and to populate a table with such information. Accordingly, this table may be a memory context table that is accessible to the OS. In various embodiments, the table may be only accessible to the OS and thus can be stored in a kernel level space, e.g., of system memory (such as a dynamic random access memory (DRAM)), although the location for storage of this table may be in other places of a system, such as in a flash memory that provides for storage of other OS tables. Further understand that in different implementations the actual identifications and number of memory contexts available can vary greatly.

Figure 1:
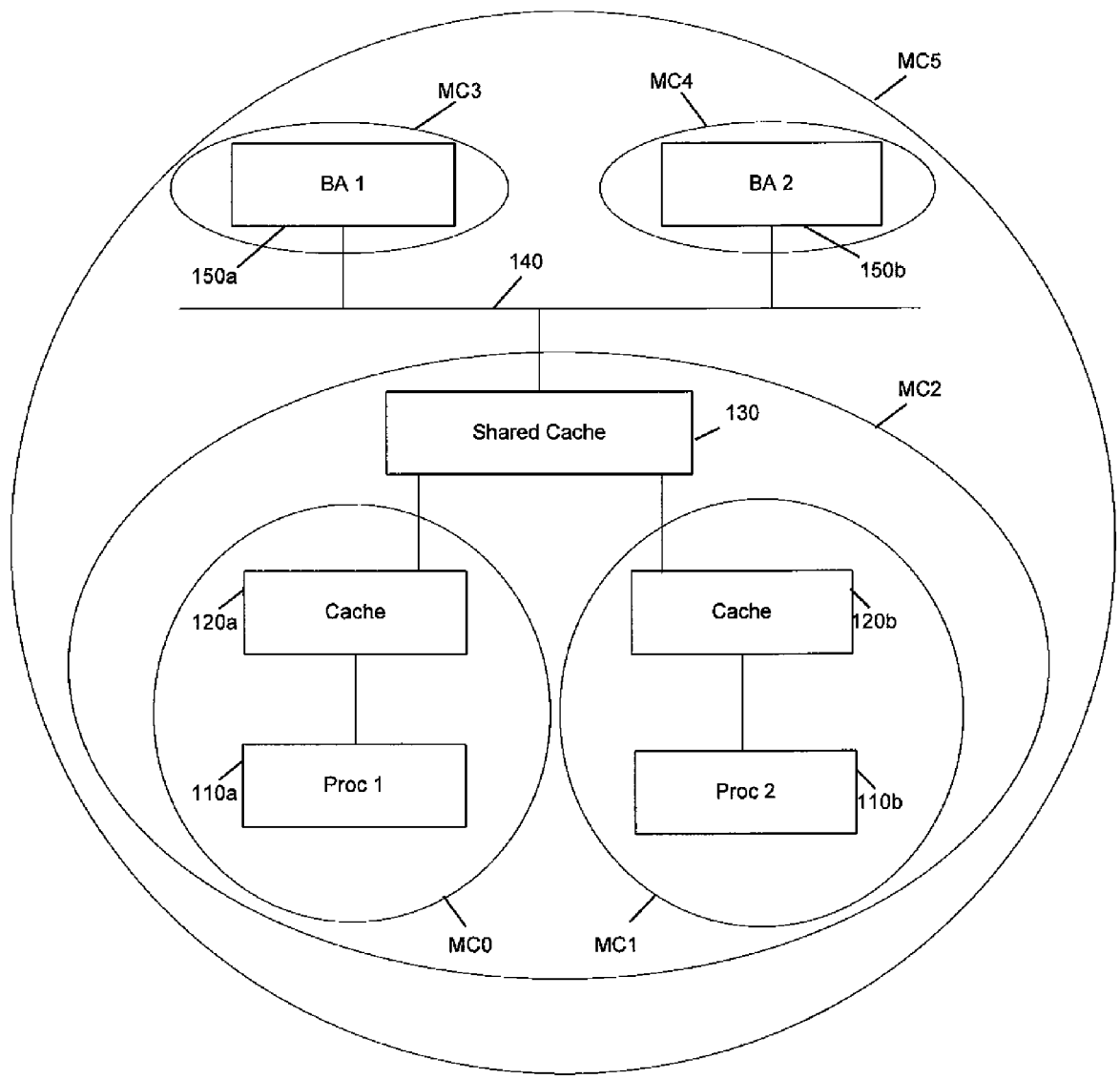
FIG. 1 is a block diagram of a portion of a system in accordance with one embodiment of the present invention.

Referring now to FIG. 1 shown is a block diagram of a portion of a system in accordance with one embodiment of the present invention. As shown in FIG. 1, system 100 may be a multiprocessor system. Specifically, FIG. 1 shows a first processor 110$_a$ and a second processor 110$_b$. While the scope of the present invention is not limited in this regard, such processors may be physical or logical processors and may be separate cores of a multi-core processor, or single core processors of a system. While not shown for ease of illustration, understand that processors 110 may further include additional structures such as a low level cache memory, uncore and other logic.

As seen, each processor 110 couples to a corresponding cache memory 120$_a$ and cache memory 120$_b$. As one example, these cache memories may be so-called L2 caches that may be present on the same semiconductor die as the corresponding processor, although the scope of the present invention is not limited in this regard. In turn, these caches (which may be private caches) are coupled to a shared cache 130, which in one embodiment may be a last level cache (LLC). In some such implementations, shared cache 130 may be of the same semiconductor die as the processors and second level caches such that all of these components form a single multi-core processor.

Still referring to FIG. 1, in turn shared cache 130 may be coupled to an interconnect 140, which in various embodiments may be a shared bus such as a front side bus or so forth. Also coupled to interconnect 140 may be one or more bus agents 150$_a$ and 150$_b$. In various embodiments, such bus agents may be peripheral devices such as input/output (I/O) devices, fixed or programmable functional units (and which may be of a heterogeneous arrangement and ISA to processor 110) and so forth. Understand that while shown these limited components in the embodiment of FIG. 1, a system may include many more components such as a system memory, mass storage devices, additional bus agents, peripheral devices, and so forth.

Still with reference to FIG. 1, note that the various components each may have a memory context associated therewith. Thus each component may be configured with a memory context identifier, e.g., by way of a fuse setting or other permanent configuration setting, or by storage of a memory context identifier as part of a configuration of the component. For example, the identifier for the memory context can be stored in a memory context identifier register, configuration register, or other storage of the component. Memory context identifiers may be implemented in a hierarchy, in which components closest to a processor core are allocated with a memory context identifier having a higher priority than those that are located further away from the processor core. Furthermore, as the memory context hierarchy increases to the more remote memories, such contexts encompass the lower memory contexts as well.

As discussed above, responsive to an identification instruction, for example, firmware may build this memory context table. While different variations are possible, in one embodiment the table for the system components shown in FIG. 1 may be generated as follows in Table 1. As seen in Table 1, the higher priority memory contexts may be associated with processors 110, which are identified in Table 1 as logical processors, although the scope of the present invention is not limited in this regard. As memory contexts advanced to the lower priority memory contexts, note that components of the higher priority memory context may also be included.

TABLE 1

| |
|---|
| MC 0 ☐ Log PROC 0, Log PROC 1 |
| MC1 ☐ Log PROC 2, Log PROC 3 |
| MC 2 ☐ Log PROC 0, Log PROC 1, Log PROC 2, Log PROC 3 |
| MC 3 ☐ Bus Agent 0 |
| MC 4 ☐ Bus Agent 1 |
| MC 5 ☐ Log PROC 0, Log PROC 1, Log PROC 2, Log PROC 3, Bus Agent 0, Bus Agent 1 |

Figure 2:
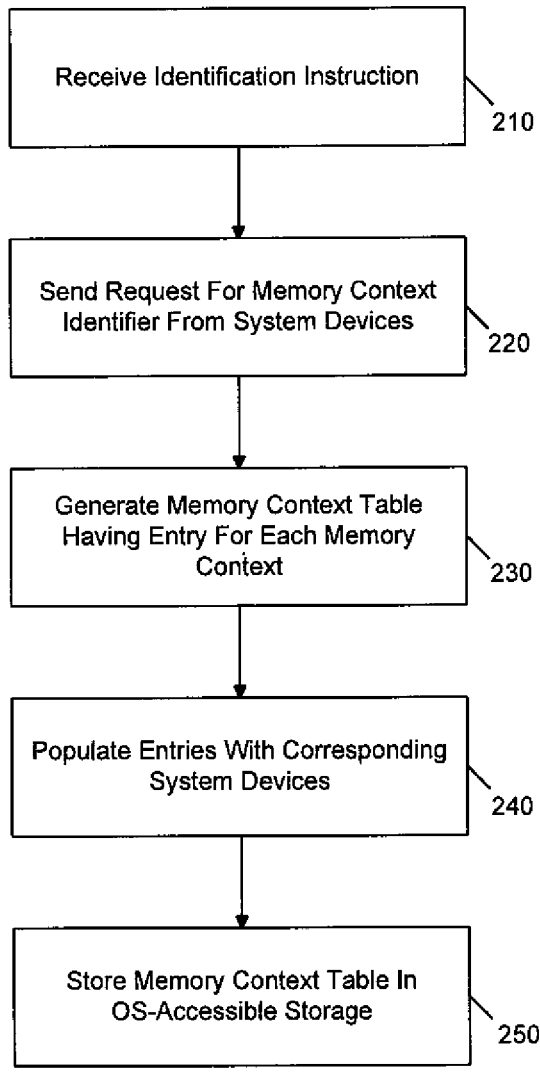
FIG. 2 is a flow diagram of a method for generating a memory context table in accordance with an embodiment of the present invention.

In various embodiments, system software may thus generate this table, whether by the OS or by another system firmware or software agent, such as basic input/output system (BIOS) running at power on self test (POST). Referring now to FIG. 2, shown is a flow diagram of a method for performing generation of a memory context table in accordance with an embodiment of the present invention. Method 200 may begin by receiving an identification instruction (block 210). For example, this CPUID instruction may be received, e.g., by BIOS on POST or by the OS in its initialization process. Assume for purposes of discussion that it is the BIOS that performs the method. Thus, as seen in FIG. 2 at block 220, BIOS may send a request for memory context identifiers to various system devices. For example, messages may be sent to system components such as those shown in FIG. 1.

Responses to these messages may be received. Then at block 230, a memory context table may be generated that has an entry for each of multiple memory contexts. The number of memory contexts available in a given system may be set by the system designer. Then BIOS may populate the entries of this table with the corresponding system device (block 240). An example of this population is shown in Table 1 above. Specifically in this example as the memory context identifiers increase in value, more system components become part of the memory context. That is, at the lowest value (e.g., memory context 0), only a single component is associated with the identifier, while as the value of the memory context identifier increases, both additional components as well as components of at least some of the preceding memory contexts are part of the given memory context. Referring again to FIG. 2, method 200 may conclude at block 250 where the memory context table is stored in an OS-accessible storage. This storage as discussed above may be system memory, flash memory, or so forth. While shown with this particular implementation in the embodiment of FIG. 2, the scope of the present invention is not limited in this regard.

Figure 3:
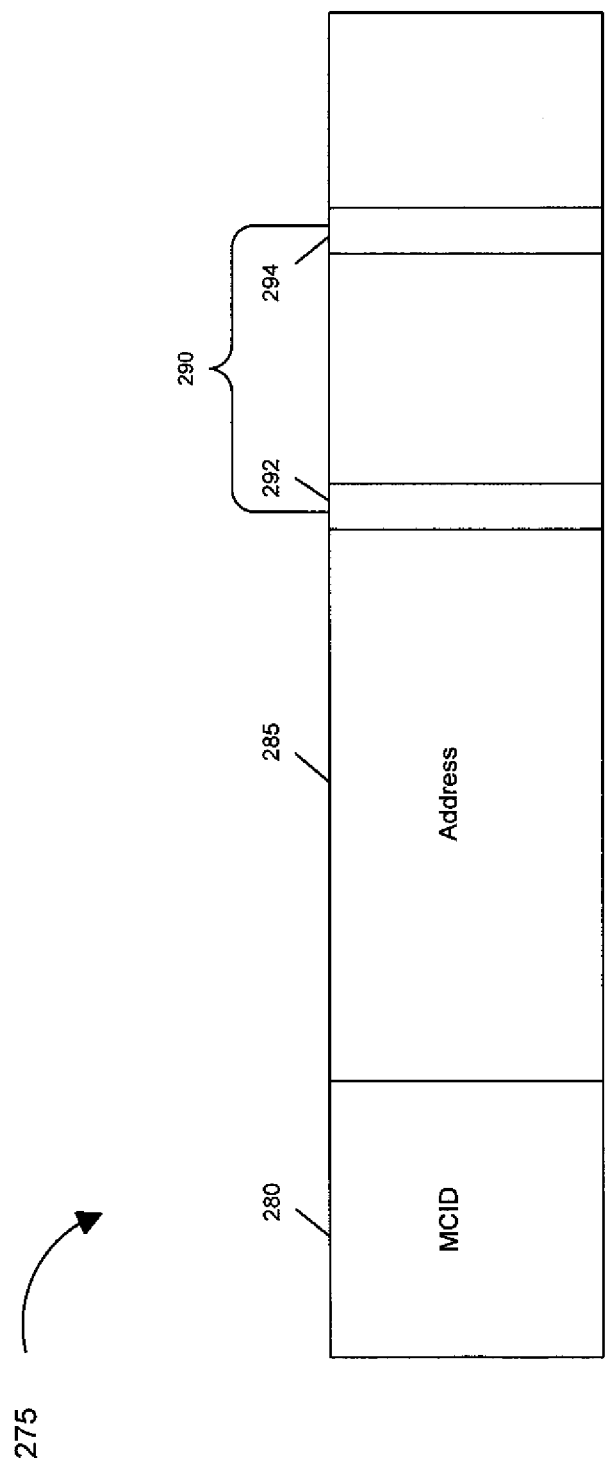
FIG. 3 is a block diagram of a page table entry in accordance with one embodiment of the present invention.

Referring now to FIG. 3, shown is a block diagram of a page table entry in accordance with one embodiment of the present invention. As shown in FIG. 3, page table entry 275 may be stored in a page table and used to provide address and attribute information for a memory page. Such page table entries may be accessed by the memory address generation hardware, and at least portions of the page table entry can be stored in a cache memory such as a translation lookaside buffer (TLB) to enable faster access to recently and/or frequently used page table entries.

As seen in FIG. 3, page table entry 275 may include an address field 285 that stores an address, e.g., of a memory page, which may correspond to a 4 kilobyte (KB) range of memory locations of a system memory. In addition, a memory context identifier field 280 may store a memory context identifier for the associated memory page to indicate in which memory context data from the page is likely to be stored. When used in this way with a valid memory context identifier present in memory context identifier field 280, an enable indicator 292 of a status field 290 may be set to indicate that a valid memory context identifier field is present. When reset, indicator 292 may thus cause memory context operations not to be performed. In various embodiments, other additional information such as other enable bits (e.g., write protect bits and so forth) may be stored in status field 290. In addition, a presence indicator 294 may indicate whether the corresponding page table entry maps to a given page in memory. While shown with this particular implementation in the embodiment of FIG. 3, understand the scope of the present invention is not limited in this regard.

Figure 4:
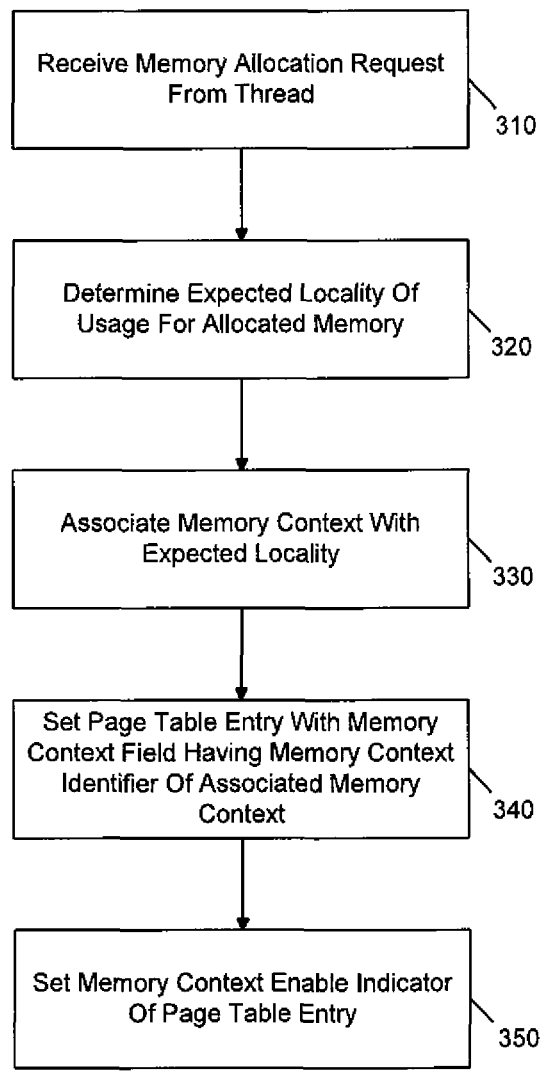
FIG. 4 is a flow diagram of a method for setting a page table entry in accordance with an embodiment of the present invention.

Referring now to FIG. 4, shown is a block diagram of a method for setting a page table entry in accordance with one embodiment of the present invention. As shown in FIG. 4 method 300 may be performed by an OS when a page is allocated in memory, e.g., responsive to a memory allocation request from a given application. Thus as seen in FIG. 4, method 300 begins by receiving a memory allocation request from a thread (block 310). Next, it may be determined the expected locality of usage for the allocated memory (block 320). While the scope of the present invention is not limited in this regard, different manners of determining the expected usage can occur in various embodiments. For example, a user-level process can provide locality information to the OS to guide its decision. Or the OS can determine locality based on its knowledge of the application/system or even based on heuristics (such as selection of a local memory first). As examples, for a single threaded application the OS may determine the expected locality to be the local memory closest to the processor that is to perform the thread. As for a multi-threaded application, the expected locality may be all memories associated with one or more processors on which the threads are to run. In some embodiments, the OS may provide an application programming interface (API) so that user-level applications can request local memory storage for non-shared data.

Based on the determined expected locality, a memory context may be associated with the expected locality (block 330). Then, a page table entry for the allocated memory page or pages may be set with the memory context field having a memory context identifier of the associated memory context (block 340).

For example, assume a single threaded application is to run on a first processor that has a memory context identifier value of 1. One or more page table entries to be associated with memory allocated for this thread may thus store a memory context identifier value of 1. Then as shown at block 350, the memory context enable indicator for the page table entry may also be set. Thus for memory allocation operations as to a uni-threaded application, memory may be allocated to always use local memory (which may be the closest memory context ID of the hardware context to which the application is assigned). As to a multi-threaded application, a memory context that includes all hardware contexts where its threads are running may be selected. Note while shown with this particular implementation in the embodiment of FIG. 4 with an example in which only a single page table entry is allocated per request, understand the scope of the present invention is not limited in this regard and in various examples many page table entries can be set responsive to a single memory allocation request, e.g., depending on the amount of memory requested by the application and the OS policy.

Figure 5:
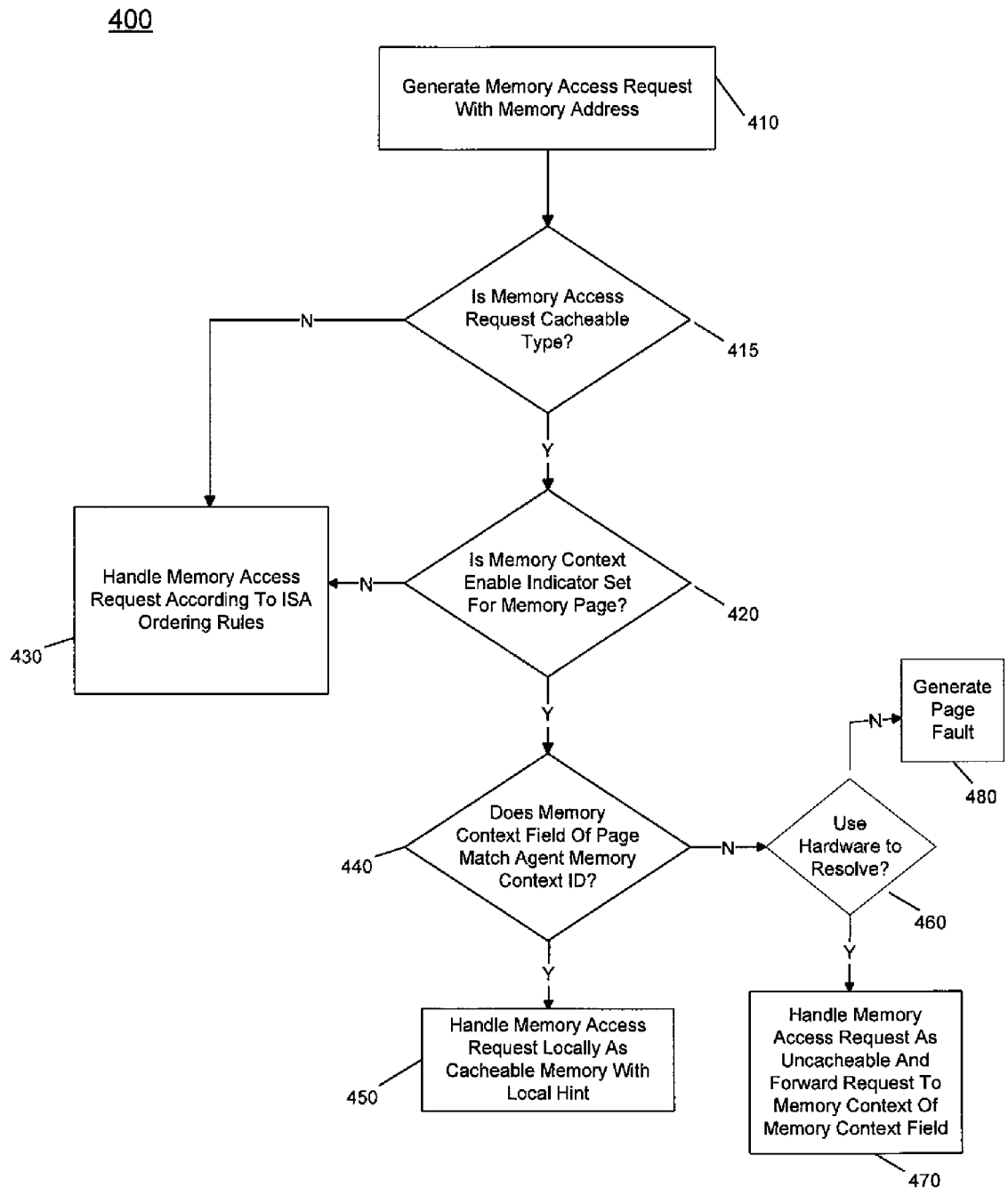
FIG. 5 is a flow diagram of a method for handling a memory access request in accordance with an embodiment of the present invention.

After the page table entry is set with the memory context information, such information may be used during program execution to enable more efficient accesses to memory and reduced memory traffic such as snoop requests and so forth. Referring now to FIG. 5, shown is a block diagram of a method for handling a memory access request in accordance with an embodiment of the present invention. As shown in FIG. 5, method 400 may begin by generating a memory request with a memory address (block 410). Next it may be determined whether the memory access request is a cacheable type (diamond 415). As one example, this may be determined by attributes in the page table entry along with some other hardware control register state (that can also be set by the OS). If not, control passes to block 430 where the memory access request may be handled according to conventional ISA ordering rules.

Otherwise, control passes to diamond 420 where it may be determined whether a memory context enable indicator is set for the memory page. This determination may be based on an enable indicator in a page table entry for the memory page. Note that in various implementations for ease of access by the AGU, the memory context information from the page table entry may be stored in a TLB or other buffer of the processor, along with the memory context field of the page table entry and translation information. If the enable indicator is not set, this indicates that no memory context information is available and accordingly control passes again to block 430. Otherwise assuming a valid memory context enable indicator, control passes to diamond 440.

Still referring to FIG. 5, it next may be determined whether the memory context field of the page matches an agent memory context identifier (diamond 440). That is, a comparison may be made between the memory context field value stored in the memory context field of the page table entry and a memory context identifier associated with the requesting agent (which in various embodiments may be a processor, bus agent, peripheral device, or other such agent). If the context identifiers match, control passes to block 450 where the memory access request may be handled locally as cacheable memory with a local hint. That is, hardware of the processor may be configured to optimize the memory access request on the basis of this local hint. Of course, various other optimizations are possible. Examples may include quickly allocating a memory cache line to be written without having to snoop any other agent in the system, directly accessing the memory controllers, eliminating a memory request snoop phase if the line is not present, or avoiding a request for ownership phase whenever a memory location is to be modified. In this way, no additional memory traffic is needed, and the memory may be accessed locally to the requestor, e.g., in a cache associated with a processor. In addition, the need for snooping traffic or access to directory information, snoop filters and so forth can be avoided, or at least reduced.

Otherwise, if at diamond 440 it is determined that the memory context identifiers do not match, control passes instead to diamond 460. At diamond 460, it may be determined whether the OS wants hardware to handle the case of this mismatch. If so, control passes to block 470, where the memory access request may be handled as uncacheable. Then depending on implementation the request may be forwarded to the memory context of the requested memory page, as this is the likely location of the requested memory. Note that by first seeking to request the data at the memory context stored in the page table, a reduced amount of memory traffic may occur.

If instead at diamond 460, hardware is not to be used, a page fault may be produced to seek the requested memory information. Thus control passes to the OS, which may resolve the issue by moving the page back to a non-local state. That is, the OS may reset the enable indicator for the corresponding page. Various operations may be performed in bringing a page back to non-local state. For example, the OS may determine whether any copy of a cache line of the page is modified in the local storage hierarchy of the context ID of the page. This may cause flushing of caches, or performing writeback invalidations of cache lines of the page. A similar mechanism may be in place for page deallocation as well: whenever a process deallocates memory (or finishes) and the OS wants to re-assign one of its local pages, all the cache lines of the old context ID hierarchy may be flushed. If an agent of the system lacks memory context ID capability, the AGU of such agent may generate a page fault if it is accessing a page with the local bit set. Then the OS can resolve as above to clear the enable indicator for the page this agent is trying to access. While shown with this particular implementation in the embodiment of FIG. 5, understand the scope of the present invention is not limited in this regard.

Figure 6:
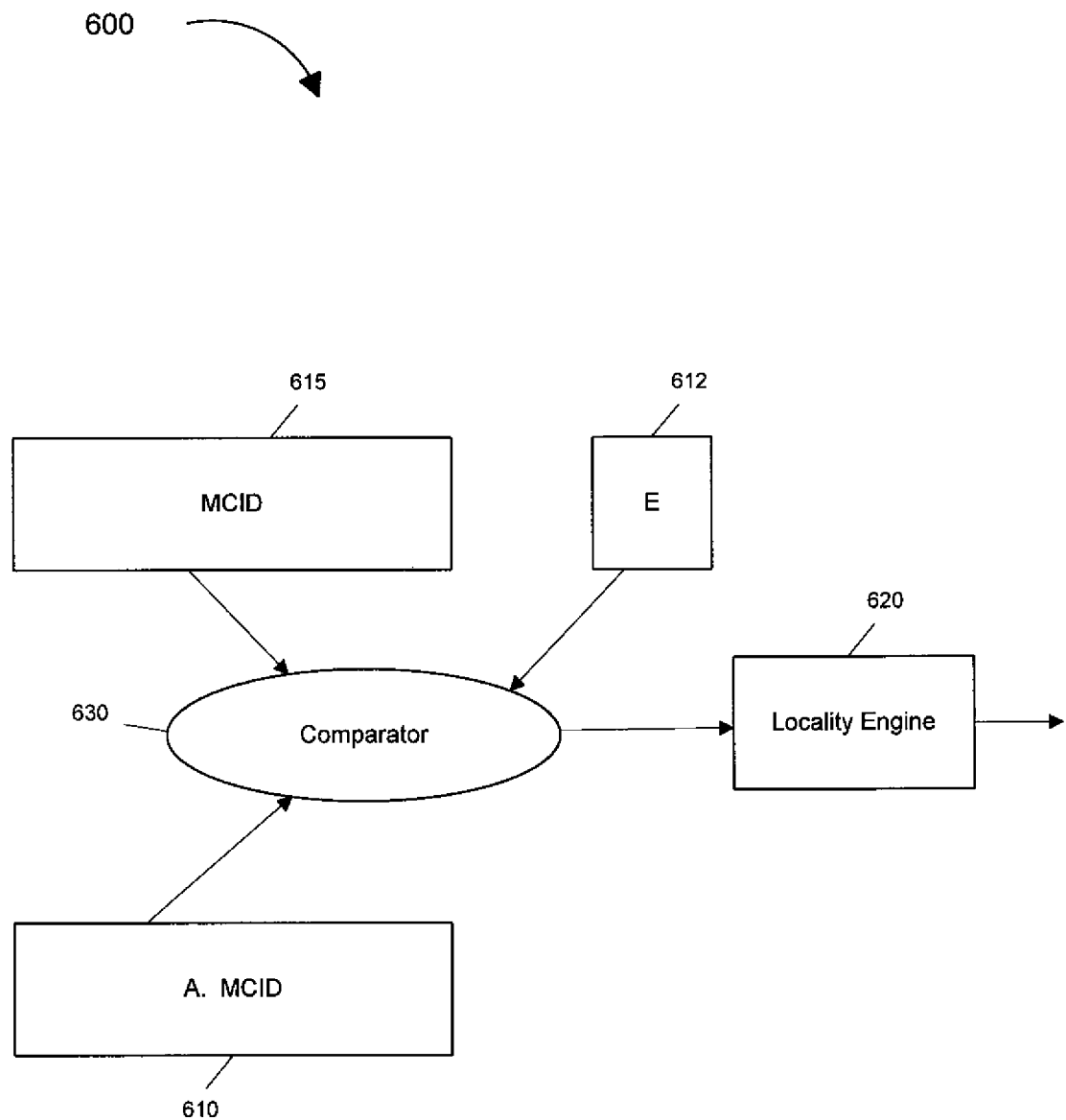
FIG. 6 is a block diagram of logic in accordance with one embodiment of the present invention.

Referring now to FIG. 6, shown is a block diagram of logic in accordance with one embodiment of the present invention. More specifically, logic 600 of FIG. 6 may be a memory context logic or module that may be incorporated within an address generation unit of a core, although this logic may be located in other places in different embodiments. As seen, logic 600 includes a comparator 630 that may receive a local memory context identifier 610 and a memory context identifier 615. As discussed above, the local memory context identifier 610 may come from a requesting agent, e.g., a processor, bus agent, or so forth, while memory context identifier 615 may be received from information present in a given page table entry. Based on the comparison and further based on an enable indicator 612 (which may also be received from the corresponding page table entry), a locality engine 620 may determine a memory type for the associated request, namely whether a given access request is for a local access (and thus a local hint is generated), or is not likely to be for a local access (and thus an external memory context hint is generated). In one embodiment, logic 600 may operate in accordance with method 400 of FIG. 5.

In general, the determination of locality for a given memory access request may proceed in accordance with a typical address generation logic and further using logic 600. Referring now to Table 2, shown is pseudo-code for performing a memory context analysis in accordance with one embodiment of the present invention. Generally this pseudo-code shows that if a memory access request is for writeback (e.g., cacheable) and the memory context identifier of the page table matches an agent memory context identifier (and an enable indicator for the page table is valid), the memory access request may be handled locally, optimizing the request and reducing communications and power consumption.

TABLE 2

Figure 7:
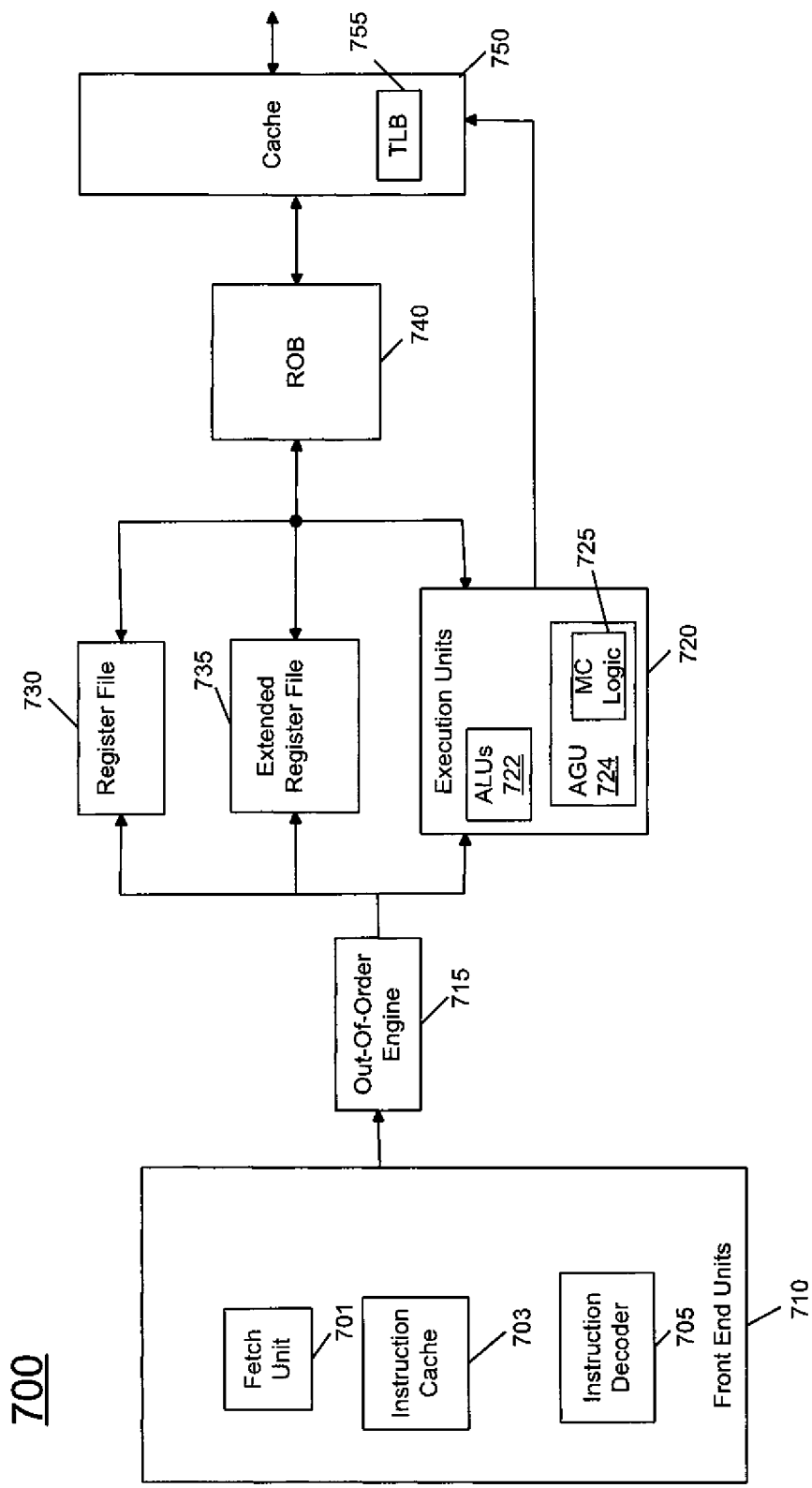
FIG. 7 is a block diagram of a processor in accordance with an embodiment of the present invention.

1 - Perform memory address and type computation
2—Modify memory type if (WB && SET ENABLE INDICATOR) then
    if (Page memory context == Local memory context) then
        local hint
        else external memory context hint
end Embodiments can be implemented in many different systems. For example, embodiments can be realized in a processor such as a multicore processor. Referring now to FIG. 7, shown is a block diagram of a processor core in accordance with one embodiment of the present invention. As shown in FIG. 7, processor core 700 may be a multi-stage pipelined out-of-order processor. Processor core 700 is shown with a relatively simplified view in FIG. 7 to illustrate various features used in connection with a memory context system in accordance with an embodiment of the present invention.

As shown in FIG. 7, core 700 includes front end units 710, which may be used to fetch instructions to be executed and prepare them for use later in the processor. For example, front end units 710 may include a fetch unit 701, an instruction cache 703, and an instruction decoder 705. In some implementations, front end units 710 may further include a trace cache, along with microcode storage as well as a micro-operation storage. Fetch unit 701 may fetch macro-instructions, e.g., from memory or instruction cache 703, and feed them to instruction decoder 705 to decode them into primitives, i.e., micro-operations for execution by the processor.

Coupled between front end units 710 and execution units 720 is an out-of-order (OOO) engine 715 that may be used to receive the micro-instructions and prepare them for execution. More specifically OOO engine 715 may include various buffers to re-order micro-instruction flow and allocate various resources needed for execution, as well as to provide renaming of logical registers onto storage locations within various register files such as register file 730 and extended register file 735. Register file 730 may include separate register files for integer and floating point operations. Extended register file 735 may provide storage for vector-sized units, e.g., 256 or 512 bits per register.

Various resources may be present in execution units 720, including, for example, various integer, floating point, and single instruction multiple data (SIMD) logic units, among other specialized hardware. For example, such execution units may include one or more arithmetic logic units (ALUs) 722. In addition, an AGU 724 may be present to generate addresses from which to obtain data and/or instructions. For example, AGU 724 may be configured to receive a register address from a register in one of the register files 730 and 335. AGU 724 may translate that address into a physical address. Such translation may be effected using information stored in a page table entry that includes translation information, in addition to memory context identification information in accordance with an embodiment of the present invention. To enable ease of access to such translation data, virtual address-to-physical address translations may be stored in a TLB 755 within a cache 750, discussed further below.

As seen, AGU 724 may further include a memory context logic 725 to perform a determination of whether a memory context for an address matches a corresponding memory context identifier for the core. In addition, such logic may enable memory accesses to be performed in an optimized manner while maintaining a given memory order model.

When operations are performed on data within the execution units, results may be provided to retirement logic, namely a reorder buffer (ROB) 740. More specifically, ROB 740 may include various arrays and logic to receive information associated with instructions that are executed. This information is then examined by ROB 740 to determine whether the instructions can be validly retired and result data committed to the architectural state of the processor, or whether one or more exceptions occurred that prevent a proper retirement of the instructions. Of course, ROB 740 may handle other operations associated with retirement.

As shown in FIG. 7, ROB 740 is coupled to cache 750 which, in one embodiment may be a low level cache (e.g., an L1 cache) and which may also include TLB 755, although the scope of the present invention is not limited in this regard. Also, execution units 720 can be directly coupled to cache 750. In various embodiments, TLB 755 may store, in addition to virtual address-to-physical address translations, a memory context identifier for the corresponding page of memory, to enable faster access to such information by AGU 724. When AGU 724 sends a request for information to cache 750 and information is not present in the cache, a cache miss occurs and the information may be obtained from other portions of a memory hierarchy. From cache 750, data communication may occur with higher level caches, system memory and so forth. Note that while the implementation of the processor of FIG. 7 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Accordingly, in various embodiments memory accesses can be optimized without any extra hardware overhead. Further, by storing a memory context identifier in page table structures, software can provide hints to the hardware and faster local storage can be realized that completely follows memory ordering rules of a given ISA. As such, embodiments may substantially reduce memory access latency in a variety of systems and reduce hardware resources that are presently used to handle the coherency issues discussed above.

Figure 8:
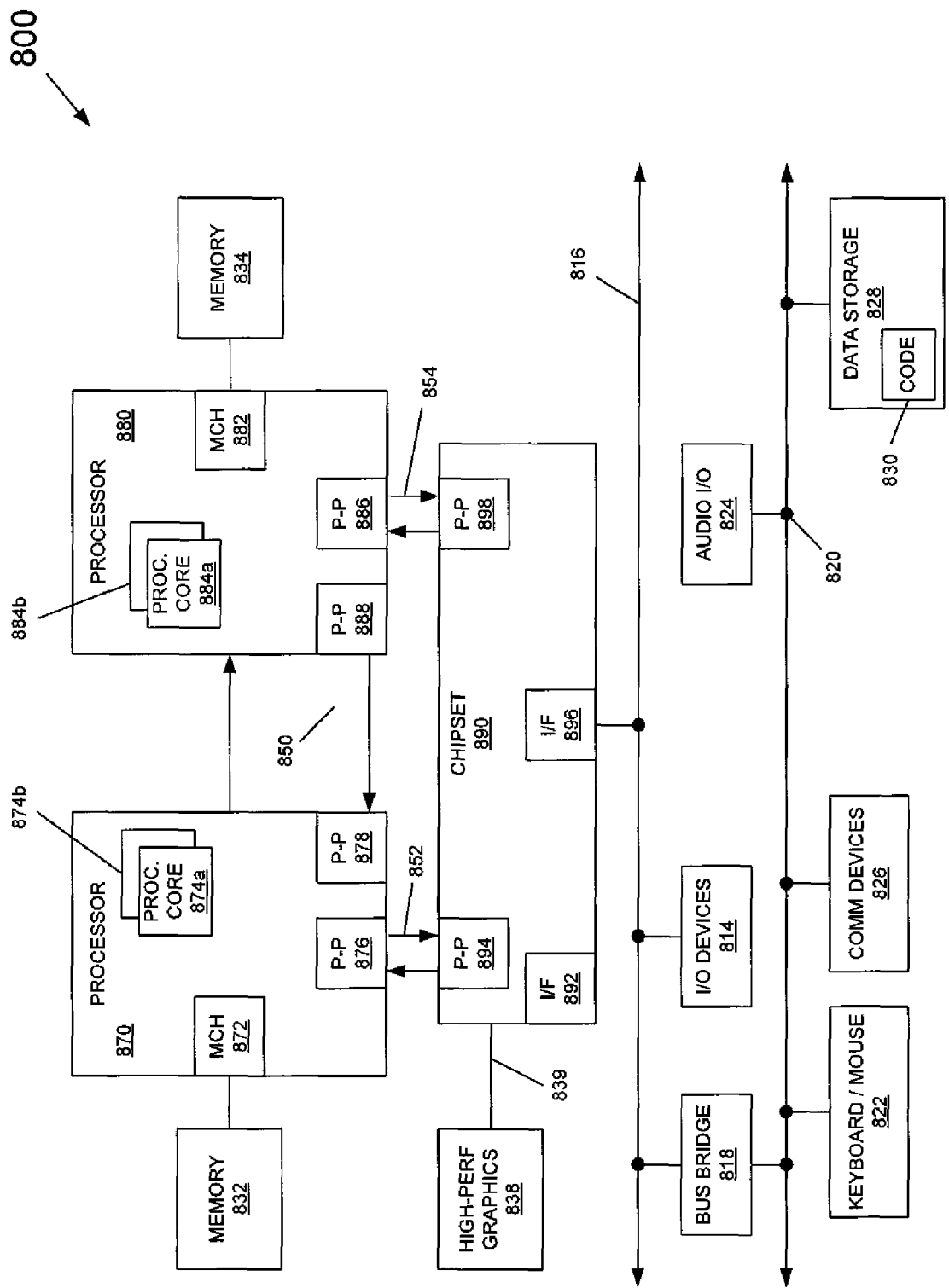
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. As described above, the processor cores may include an AGU or other logic to perform memory context operations in accordance with an embodiment of the present invention. Still further, both the cores and other components of the system may include storage for a corresponding agent memory context identifier associated with the component.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of main memory (e.g., a dynamic random access memory (DRAM)) locally attached to the respective processors. First processor 870 and second processor 880 may be coupled to a chipset 890 via P-P interconnects 852 and 854, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
at least one core having a plurality of execution units and an address generation unit (AGU) configured to generate an address for a memory access request, wherein the AGU includes a first logic configured to determine whether a memory context identifier associated with the address corresponds to an agent memory context identifier for the at least one core, and to handle the memory address request based on the determination, wherein the first logic is configured to handle the memory access request locally as a cacheable memory write request responsive to a determination that the memory context identifier and the agent memory context identifier match.

2. The processor of claim 1, wherein the first logic is configured to handle the memory access request as an uncacheable write request responsive to a determination that the memory context identifier and the agent memory context identifier do not match.

3. The processor of claim 2, wherein responsive to the determination of no match the first logic is configured to forward the request to a location of the memory context identifier associated with the address.

4. The processor of claim 2, wherein responsive to the determination of no match the first logic is configured to provide the memory access request to a page fault handler.

5. The processor of claim 1, wherein the first logic is configured to obtain the memory context identifier associated with the address from a page table entry associated with the address, at least a portion of the page table entry including the memory context identifier stored in a translation lookaside buffer (TLB) of the processor.

6. The processor of claim 5, wherein an operating system (OS) is configured to store the memory context identifier associated with the address in the page table entry responsive to a memory allocation request from a thread.

7. The processor of claim 6, wherein the OS is configured to set the memory context identifier associated with the address responsive to a determination of expected locality of memory usage by the thread.

8. The processor of claim 6, wherein the OS is configured to further set a memory context enable indicator of the page table entry to indicate storage of the memory context identifier associated with the address within the page table entry.

9. A method comprising:
sending, responsive to an identification instruction, a request for a memory context identifier to a plurality of agents of a system, the memory context identifier configured to indicate a memory context associated with a corresponding agent, and receiving the memory context identifiers from the plurality of agents;
generating a memory context table having an entry for each agent and populating the corresponding entry with the memory context identifier for the agent, and storing the memory context table in a storage of the system accessible to an operating system;
receiving a memory allocation request from a thread and determining an expected locality of usage for a portion of a memory hierarchy of the system to be allocated to the memory allocation request; and storing a memory context identifier in a memory context field of a page table entry for the allocated memory portion, the memory context identifier based on the expected locality, and setting a memory context enable indicator of the page table entry to indicate presence of a valid memory context identifier.

10. The method of claim 9, further comprising accessing the memory context identifier in the page table entry and determining whether the memory context identifier in the page table entry matches a memory context identifier for a requestor, and if so, handling a memory access request for the requestor as a local cacheable memory request.

11. A system comprising:

a processor having at least one execution unit configured to execute instructions and an address generation unit (AGU) configured to generate an address for a memory access request, wherein the AGU is configured to indicate that the memory access request be handled in an optimized manner with respect to a memory order model of the processor if a memory context identifier associated with the address corresponds to an agent memory context identifier for the processor, wherein the AGU is configured to indicate that the memory access request is to be handled locally as a cacheable memory write request responsive to a determination that the memory context identifier and the agent memory context identifier match; and a dynamic random access memory (DRAM) coupled to the processor.

12. The system of claim 11, wherein the AGU is configured to indicate that the memory access request is to be handled as an uncacheable write request responsive to a determination that the memory context identifier and the agent memory context identifier do not match.

13. The system of claim 11, wherein the DRAM is configured to store a page table having a plurality of page table entries, each of the page table entries including a memory context field to store a memory context identifier for a corresponding memory page and a status field to store an enable indicator for the memory context field.

14. The system of claim 13, wherein processor further includes a translation lookaside buffer (TLB) to store a plurality of entries each including a translation for a memory page and a copy of the memory context identifier for the corresponding memory page.

15. The system of claim 14, wherein the processor includes a register to store an agent memory context identifier associated with the processor.

16. The system of claim 15, wherein the AGU is to access both the copy of the memory context identifier for the corresponding memory page in the TLB and the agent memory context identifier in the register to perform the indication.

* * * * *